United States Patent
Broder et al.

(10) Patent No.: US 6,349,296 B1
(45) Date of Patent: Feb. 19, 2002

(54) METHOD FOR CLUSTERING CLOSELY RESEMBLING DATA OBJECTS

(75) Inventors: Andrei Z. Broder, Menlo Park; Steven C. Glassman, Mountain View; Charles G. Nelson, Palo Alto; Mark S. Manasse, San Francisco; Geoffrey G. Zweig, Oakland, all of CA (US)

(73) Assignee: AltaVista Company, Palo Alto, CA (US)

(*) Notice: Subject to any disclaimer, the term of this patent is extended or adjusted under 35 U.S.C. 154(b) by 0 days.

(21) Appl. No.: 09/642,017

(22) Filed: Aug. 21, 2000

Related U.S. Application Data (63) Continuation of application No. 09/048,653, filed on Mar. 26, 1998, now Pat. No. 6,119,124.

(51) Int. Cl.$^7$ .............................................. G06F 17/30
(52) U.S. Cl. ...................................... 707/3; 703/103 R
(58) Field of Search .............................. 707/1–3, 6, 5, 707/10, 103–104, 102, 500.1, 541; 382/137

(56) References Cited

U.S. PATENT DOCUMENTS

| | | | |
|---|---|---|---|
| 5,488,725 A | * 1/1996 | Turtle et al. .................... | 707/5 |
| 5,675,819 A | * 10/1997 | Schuetze ...................... | 704/10 |
| 5,724,571 A | * 3/1998 | Woods .......................... | 707/5 |
| 5,819,258 A | * 10/1998 | Vaithyanathan et al. ........ | 707/2 |
| 5,857,179 A | * 1/1999 | Vaithyanathan et al. ........ | 707/2 |
| 5,909,677 A | * 6/1999 | Broder et al. ................... | 707/3 |
| 5,937,084 A | * 8/1999 | Crabtree et al. ............. | 382/137 |
| 6,119,124 A | * 9/2000 | Broder et al. ................ | 707/103 |

OTHER PUBLICATIONS

Hochberg et al., Automatic Script Identification From Images Using Cluster–Based Templates, Sep. 1995, Los Alamos National Laboratory, vol. I, pp. 378–381.*

Hull et al., World Image Matching As A Technique for Degraded Text Recognition, 1992, vol. II, State University of New York, Baffulo, 665–668.*

Hochberg et al. Automatic Script Identification from Document Images Using Cluster–Based Templates, Feb. 1992, Pattern Analysis and Machine Intelligence, pp. 176–181.*

Brin et al.; Copy Detection Mechanisms for Digital Documents; Department of Computer Science; www.db.stanford.edu/~sergy/copy.html.

Broder; Some Applications of Rabin's fingerprinting method; Methods in Communications, Security, and Computer Science; pp. 1–10; 1993.

Carter et al.; Universal Classes of Hash Functions; Journal of Computer and System Science; vol. 18; pp. 143–154; 1979.

(List continued on next page.)

*Primary Examiner*—John Breene
*Assistant Examiner*—Mohammad Ali
(74) *Attorney, Agent, or Firm*—Hunton & Williams (57) ABSTRACT

A computer-implemented method determines the resemblance of data objects such as Web pages. Each data object is partitioned into a sequence of tokens. The tokens are grouped into overlapping sets of the tokens to form shingles. Each shingle is represented by a unique identification element encoded as a fingerprint. A minimum element from each of the images of the set of fingerprints associated with a document under each of a plurality of pseudo random permutations of the set of all fingerprints are selected to generate a sketch of each data object. The sketches characterize the resemblance of the data objects. The sketches can be further partitioned into a plurality of groups. Each group is fingerprinted to form a feature. Data objects that share more than a certain numbers of features are estimated to be nearly identical.

20 Claims, 8 Drawing Sheets

OTHER PUBLICATIONS

Heintze et al.; Scalable Document Fingerprinting (Extended Abstract) found 169 www.cs.cmu.edu/afs/cs/user/nch/www.koala/main.htm on Sep. 1997.

Karp et al.; The Bit Vector Intersection Problem, Proceedings of 36th Annual Symposium of Computer Science; IEEE Computer Society Press, Oct. 23–25, 1995: pp. 621–634.

Shivakumar et al; Building a Scalable and Accurate Copy Detection Mechanism; Proceedings of 1st ACM Conference on Digital Libraries (DL '96), 1996.

Shivakumar et al; SCAM: A Copy Detection Mechanism for Digital Documents; Proceedings of 2nd International Conference in Theory and Practice of Digital Libraries; 1995.

* cited by examiner

FIG. 8

METHOD FOR CLUSTERING CLOSELY RESEMBLING DATA OBJECTS

This application is a continuation application of U.S. patent application Ser. No. 09/048,653, filed on Mar. 26, 1998 now U.S. Pat. No. 6,119,124.

FIELD OF THE INVENTION

This invention relates generally to the field of computerized processing of data objects, and more particularly to extracting features from data objects so that like data objects can be identified.

BACKGROUND OF THE INVENTION

In many computer systems, it useful to determine the resemblance between objects such as data records. The data records can represent text, audio, or video signals For example, Internet search engines maintain indices of millions of data records in the form of multimedia documents called Web pages. In order to make their Web pages more "visible," some users may generate thousands of copies of the same document hoping that all documents submitted will be indexed.

In addition, duplicate copies of documents may be brought into different Web sites to facilitate access, this is known as "mirroring." That is, identical, or nearly identical documents are located at different Web addresses. Other sources for "almost" duplicate documents arise when documents under go revision, documents are contained in other documents, or documents are broken into smaller documents.

A search engine, such as the AltaVista™ search engine, can greatly reduce the amount of disk used for storing its index when only a single copy of a document is indexed. The locations of other copies or nearly identical versions of the document can then be associated to the stored copy. Therefore, it is useful to determine to what extent two documents resemble each other. If a new document to be indexed highly resembles a previously indexed document, then the content of the new document does not need to be indexed, and only its location needs to be linked to the previously indexed document.

Classically, the notion of similarity between arbitrary bit strings has been expressed as a distance, for example, the Hamming distance or the edit distance. Although these distance metrics are reasonable for pair-wise comparisons, they are totally inadequate at the scale of the Web where the distance between billions of pairs of documents would need to be measured.

In U.S. Pat. No. 5,909,677 filed by Broder et al. on Jun. 18, 1996, a method for determining the resemblance of documents is described. The method measures to what extent two documents are "roughly" the same. The AltaVista™ search encine uses this method to discard approximately 10K pages out of the 20K daily submissions. As an advantage, the method does not require a complete copy of the content of documents to be compared. That would waste storage as well as processing time. Instead, the method stores a small "sketch" that characterizes the document.

The method works by processing the document to abstract the content of the document into a sketch. For example, the content of complex documents expressed as many thousands of bytes can be reduced to a sketch of just hundreds of bytes. The sketch is constructed so that the resemblance of two documents can be approximated from the sketches of the documents with no need to refer to the original documents. Sketches can be computed fairly fast, i.e., linear with respect to the size of the documents, and furthermore, given two sketches, the resemblance of the corresponding documents can be computed in linear time with respect to the size of the sketches.

Documents are said to resemble each other when they have the same content, except for minor differences such as formatting, corrections, capitalization, web-master signature, logos, etc. The resemblance can be expressed as a number between 0 and 1, defined precisely below, such that when the resemblance of two documents is close to one it is likely that the documents are roughly the same, and when the resemblance is close to zero, they are significantly dissimilar.

When applying this method to process the entire Web, which is roughly estimated to have hundreds of million of documents, the cost of computing and scoring the sketches is still prohibitive. In addition, since the data structures that need to be stored and manipulated count in the hundreds of millions, efficient memory operations are extremely difficult, particularly when they have to be performed in a reasonable amount of time.

Therefore, it is desired to provide a method that can determine when the resemblance of documents is above a certain threshold using less storage, and less processing time.

SUMMARY OF THE INVENTION

Provided is a computer-implemented method for determining the s resemblance of data objects such as Web pages indexed by a search engine connected to the World Wide Web. Each data object is partitioned into a sequence of tokens. The tokens can be characters, words, or lines of the data objects. Overlapping sets of fixed number of tokens of each object are grouped into shingles.

Each shingle is assigned a unique identification and viewed as an element of a set associated with the data object. The unique identifications can be determined by, for example, digital fingerprinting techniques. A plurality of pseudo random permutations are applied to the set of all possible unique identifications to generate permuted images of the sets. For each data object, a minimum or smallest element from the image of its associated set under each of these permutations is selected. The elements so selected constitute a sketch of the data object. The sketches characterize the resemblance of the data objects. A typical sketch comprises five hundred to a thousand bytes.

In addition, the selected elements that form the sketch can be partitioned into a plurality of groups, for example, six groups for each sketch. The groups are fingerprinted again to thus generate a plurality of, for example, six features that further characterize the resemblance of the data object. The vector of features associated with a data object would typically comprise thirty to a hundred bytes.

A first and a second data object are designated as fungible when the first and second data object share more than a certain threshold, for example, two of their features. Fungible data objects are collected into clusters of highly resembling data objects. For some types of data objects fungibility can be based on more than two common features.

In one aspect of the invention, frequently occurring shingles can be eliminated. If the data objects are Web pages, example frequent shingles are HTML comment tags that identify the program that generated the Web page, shared headers or footers, common text such as sequences of numbers, etc.

In another aspect of the invention, the parsing, grouping, representing, selecting, partitioning, and fingerprinting, are performed with first parameters to determine the tokens, shingles, fingerprints, groups, and features. These steps can then be repeated with second parameters to perform variable threshold filtering of the data objects.

DETAILED DESCRIPTION OF THE PREFERRED EMBODIMENT

Figure 1:
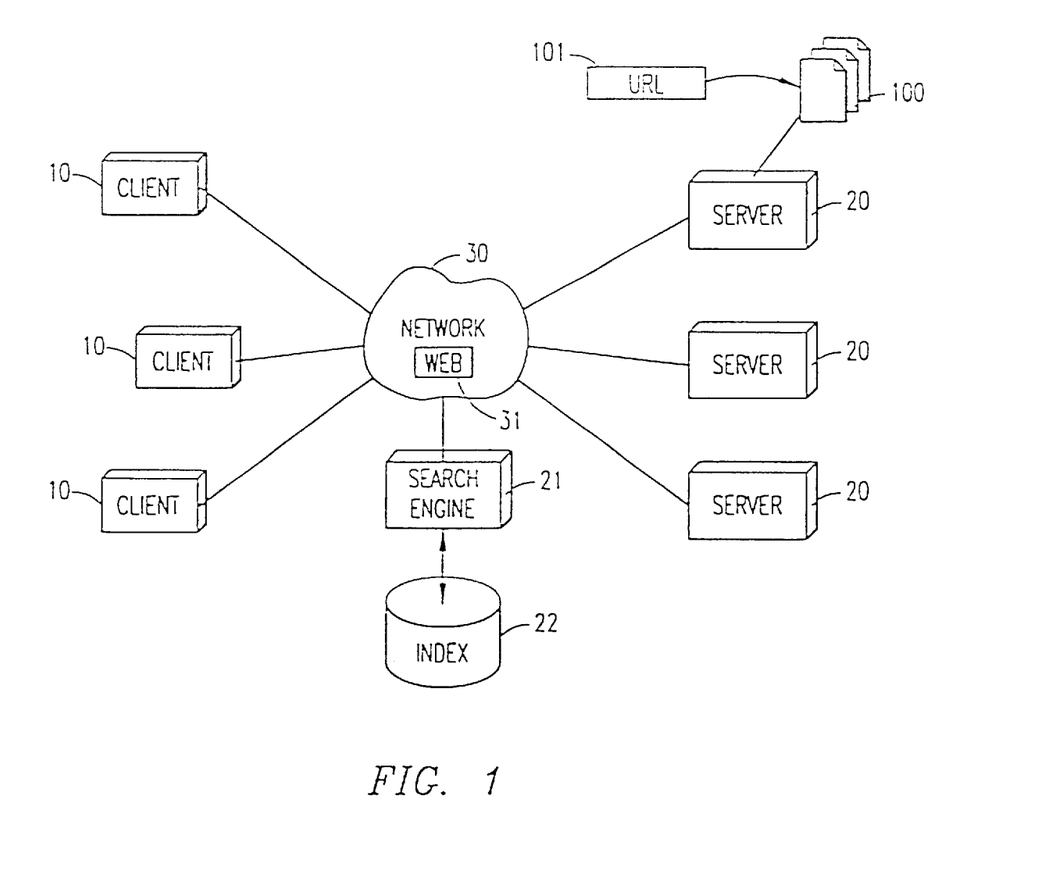
FIG. 1 is a block diagram of a distributed computer system that can cluster resembling documents in accordance with the invention.

FIG. 1 shows a massively distributed network of computers. The network includes client computers 10 and server computers 20 connected by, for example, the Internet 30. The possible hardware and software configurations for the client and server computers are well known and too numerous to detail here.

The Internet 30 includes an application-level interface called the World Wide Web (Web) 31. The Web allows for the interchange of multimedia data records frequently in the form of documents 100 that are commonly called Web pages. Associated with each Web page is an address called a Universal Resource Locator (URL). The Web pages are maintained by the servers 20. Users of the clients 10 typically access the documents 100 using Web browsers such as the Netscape Navigator™, or the Microsoft Internet Explorer™.

During operation of the network, users frequently use a specialized server called a search engine 21 to locate specific documents of interest, for example, the AltaVista™ search engine. The search engine 21 maintains a full word index 22 that can be searched to locate documents on any of the servers 20 having specific content. In order to make the size of the index 22 manageable, documents that are like each other, to a fairly high level of resemblance, can be indexed just once. Then, only the URL and a minimal amount of other information needs to be retained by the search engine 21 to still allow access to any copy of a document.

Documents for the index 22 are located by what is known as a "spider" of the search engine 21. The spider periodically scans the Web for new or revised documents to bring into the index. As the spider locates documents, unique IDs can be assigned sequentially, and the URLs can be mapped to the IDs. Before the spider hands-off a document to the indexer of the search engine 21, a check is made to see whether a like document has previously been indexed. If so, then the document itself can be discarded to greatly conserve the amount of storage used by the index 22. Described are methods for making this checking as efficient as possible.

Introduction

I. One way to express the similarity of documents is as a set intersection problem. This can be done by first decomposing each document into a canonical sequence of tokens. The tokens are then shingled. A shingle is a contiguous sequence of k tokens. All shingles have the same length, k, typically between three and fifteen tokens. The extent to which the sets of shingles associated to two documents intersect determines their resemblance. More precisely the resemblance is the relative size of the intersection of the sets $$|A \cap B|/|A \cup B|$$

The set of shingles associated with a document is too large to manipulate conveniently. Hence the shingles are first reduced to unique identifications and common shingles are ignored. The unique identifications can be computed as digital fingerprints. Then, a representative selection is made from the set of fingerprints. This selection constitutes a sketch of the document. The sketches must be such that they lead to a good estimate of the resemblance of documents.

II. Three processes can be used to measure the relative size of intersection of the sets via sketches. These alternative processes have different computational characteristics and produce different sketches. All processes use pseudo-random permutations of the universe of shingle fingerprints, that is the set of all possible fingerprints.

IIa) In the first process, keep the minimum s elements of the image of each set under a single random permutation of the universe. Here, the sketches are of a fixed size, and the relative size of the intersection is fast to compute via merging of sketches.

IIb) In the second process, keep the elements of the image of each set under a single permutation of the universe that are 0 mod m for a certain integer value m. As a disadvantage, the expected size of the sketch is proportional to the size of the set, namely the size of the sketch is $|A|/m$. As an advantage, the relative level of resemblance is fast to compute, and containment, described below, can also be estimated.

IIc) In the third process, choose "s" independent random permutations of the universe. For each set keep the minimum element of the image of the set under each of these permutations. This process is slower to compute but is better suited for filtering highly resembling documents as described below It should be understood that these methods can be used for any set intersection problem. In particular, if similar or other data objects, e.g., speech or video, are reduced to a set intersection problem, as described is herein, then these processes can be applied.

III. Instead of determining the pair-wise resemblance of documents by measuring the relative size of the intersection of their associated sets of shingles, it is also possible to cluster the documents that are "close" to each other. Here, closeness is measured in terms of the resemblance distance. In other words, resemblance is simply used to determine whether or not a set is a member of a particular cluster. This can be done using five alternative methods, depending on the particular application, and desired result.

IIIa) In the first method for any desired level of resemblance, sets of like documents are clustered while keeping track of the level of resemblance of each document to the documents already clustered. This is a useful way for clustering Web pages. This method uses sketch generation methods IIa, IIb, or IIc, preferrably IIa or IIb as described above.

IIIb) In the second method for a relative high level of resemblance, the levels of resemblance are tracked using super-shingles, described below, as hints. The hints indicate whether a particular document should be considered for addition to a particular cluster. If so, the resemblance is determined as above. This uses sketch generation method IIa, IIb, or IIc, preferably IIa.

IIIc) In the third method for a very high level of resemblance, the actual levels of resemblance are not tracked as in process IIIa above, instead, the sketches are further reduced into document "features," described below. Documents that share more than a certain number of features are deemed fungible, meaning highly resembling, and grouped into the same cluster. This uses sketch generation method IIc.

IIId) In the fourth method, also for a very high level of resemblance, super-shingles are used as hints, as in method IIIb above, but without determining the actual levels of resemblance. This method, although less precise, is fast and can be used in applications where a large number of resembling documents are suspected. This method uses sketch generation method IIa, IIb, or IIc, preferably IIa.

IIIe) In the fifth method, documents that are "roughly" contained within other documents are clustered together. This uses sketch generation method IIb.

The processes and methods introduced above, are now described in greater detail.

Figure 2:
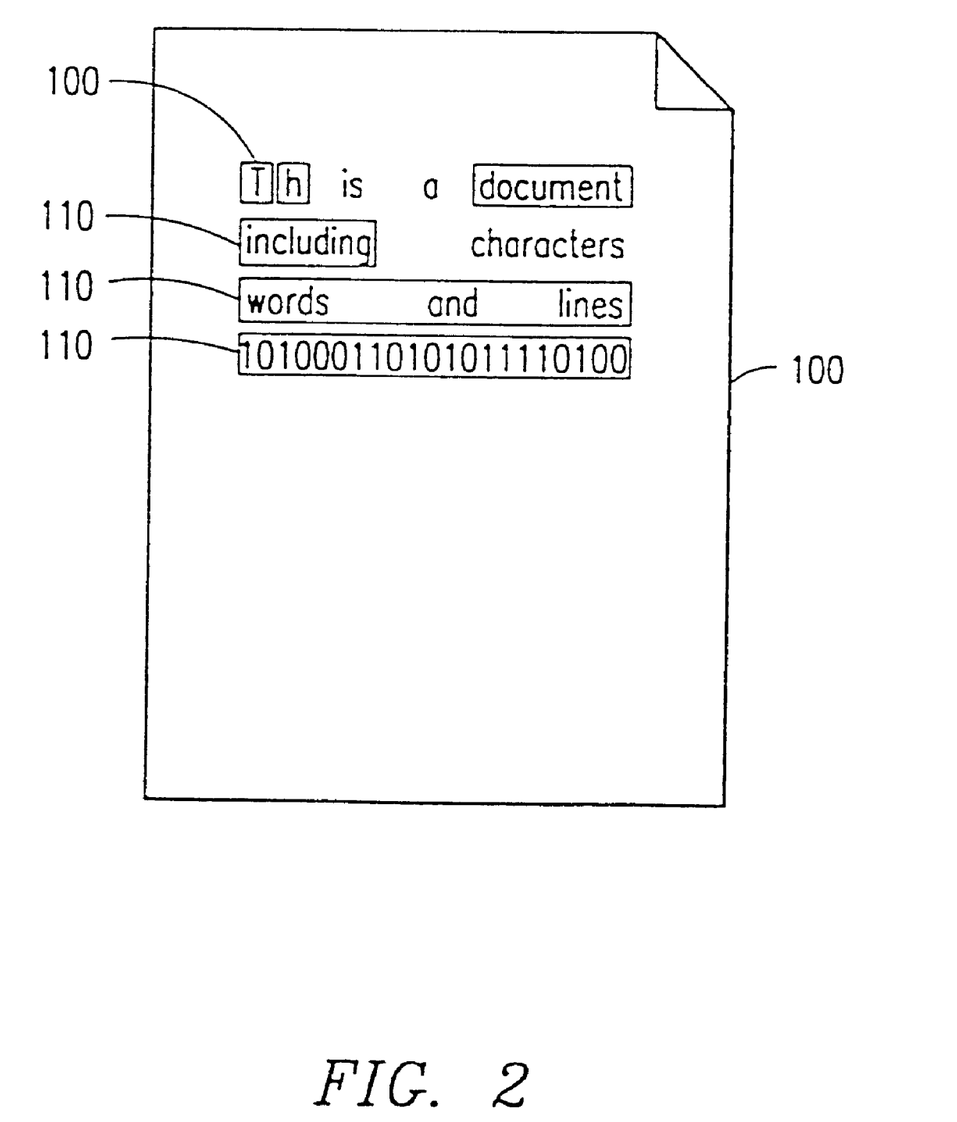
FIG. 2 shows a document parsed into a sequence of tokens that can be grouped as overlapping shingles.

As shown in FIG. 2, any data object, for example, a "document" 100 can be viewed as a linear sequence of tokens 110. Tokens can be arbitrary document features, for example, characters, words, or lines. It should be understood that in multimedia documents the tokens 110 are not necessarily human readable. Tokens may represent parts of graphic images, videos, audio, or, for that matter, any digitally encoded data. For the purpose of this detailed description, all that matters is that the each document can be decomposed into a canonical sequence of tokens.

The tokens are grouped into overlapping fixed size sequences of k contiguous tokens called shingles 120 For example, for k=3, {This, is, a} is a shingle of the document 100, as is {is, a, document}. The tokens 110 of a particular document can be grouped into shingles 120 in many different ways, but for any shingling, the number of tokens in any particular shingle is the same. Although the invention is described with reference to determining the resemblance of documents, it should be noted that the general method can be applied to any data object from which discernable features can be extracted and stored as a canonical sequence or set.

Parse document into tokens

Figure 3:
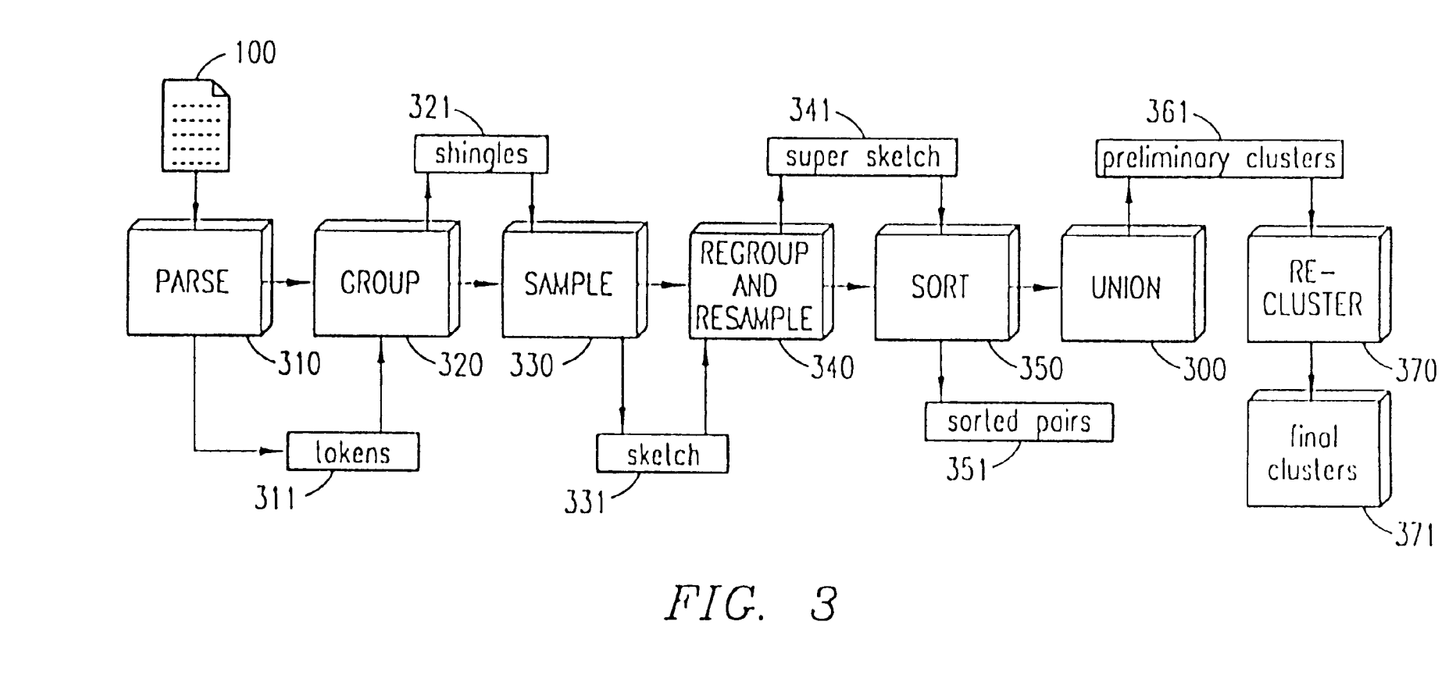
FIG. 3 is a flow diagram of a first embodiment of the invention.

As shown in step 310 of FIG. 3, each document 100 to be compared for resemblance is parsed to produce a canonical sequence of tokens 110. It should be kept in mind that when the input data records are Web documents, the combined size of the input data can be on the order of 300 Gbytes. This is a non-trivial amount of data to process in a reasonable amount of time, e.g., hours instead of days.

As stated above, the tokens can be consecutive characters, words, or lines. Identical documents will reduce to the same sequence of canonical tokens. In the specific case of Web pages, canonical can mean that any formatting, case, and other minor feature differences, such as HTML commands, spacing, punctuation, etc., are ignored. Other canonical reductions are possible or even desirable in other contexts.

Group tokens

In step 320, the tokens 110 are grouped into shingles 120. The "k-shingling" of a document D is the identification of a multi-set of all shingles of size k contained in the document. This multi set is denoted as S(D, k).

The resemblance R of two documents A and B is defined as the ratio:

$$|S(A, k) \cap S(B, k)|/|S(A, k) \cup S(B, k)|$$

Thus, two documents will have a high resemblance when the documents have many common shingles. The resemblance can be expressed as some number in the interval 0 to 1, and for any shinling, $R_k$ (A, A)=1. In other words, document A always resembles itself 100%. With a careful choice of the size of the tokens and shingles, strong resemblance, that is, close to 1, will capture the notion of two documents being "roughly" the same.

Note, however, when document A resembles document B by 100% for a shingle size of 1, this only means that B is some arbitrary permutation of A. For larger sized shingles, this is still true, but now only certain permutations are possible. For example, if A={a, b, a, c, a}, and B={a, c, a, b, a}, then A resembles B 100% for a size of two. Increasing the size of shingles makes the resemblance checking, algorithm more sensitive to permutation changes, but also more sensitive—possibly oversensitive—to insertion and deletion changes.

Estimating the relative size of the intersection of sets

The shingling process described above reduces the issue of computing resemblance to computing the relative size of the intersection of certain sets. However, these sets can be very large and thus it becomes necessary to estimate their relative intersection from much smaller sketches associated to each set as described below.

Generating sketches

In the following steps, a small "sketch" which suffices to estimate a measurement of the resemblance distance between any two documents is produced. First, a unique identification g(w) is assigned to each distinct shingle w using fingerprinting 330. Then, a random permutation 8 of the set of all possible fingerprints is computed in step 340 to produce a plurality of random images of the unique identifications. The permutation 341 makes it possible to compute numbers δ(g(w)) for the shingles S(A, k) in each document. In step 350, we select a predetermined number s of the smallest elements 351 of δ (S(A, k)). We store these smallest s elements as a list 361 sorted in order in step 360.

This sample will be the sketch of the document. It should be understood that the largest (maximum) s elements can alternatively be sampled and sorted. Other equivalent schemes are possible.

The algorithm used for computing the unique identification g(w) is not important. Any method for generating short unique identifications with high probability can be used. A very convenient possibility is to use the well-known Rabin technique for fingerprinting strings. Fingerprints are short tags for larger data objects. Fingerprints have the property that when two fingerprints are different the corresponding objects are certainly different, and there is only a very small probability that two different objects have the same fingerprint. Rabin's fingerprinting scheme is based on arithmetic modulo of an irreducible polynomial with coefficients in $Z_2$. The method has a very fast software implementation.

Given the sketches s(A) and s(B) of two documents computed as above, their resemblance is computed as follows: the smallest s elements of s(A)∪s(B) are selected thus obtaining s(A∪B); the resemblance is estimated as: |s(A∪B) ∩s(A)∩s(B)|/|s(A∪B). That is, we check how many elements in s(A∪B) belong to both A and B.

Because His process is quite sensitive, the size parameters need to be carefully selected. Clearly, the larger the size of the sample, the more accurate the result will be, however, larger samples require more storage. In the context of the search engine application, the magnitude of the input data imposes severe restrictions on the size of the data structure. Just one extra bit per document will consume four additional Megabytes of storage and corresponding additional processing time.

The number of elements in s(A∪B) that belong to both A and B has a hypergeometric distribution. When the size of the sample is much smaller than the actual document, this can be also approximated as a binomial distribution. The probability that the resemblance measurement estimate is correct, within some threshold, can readily be computed.

Super-shingles and super-sketches

Super-shingles can be derived by reprocessing the lists 361 in a similar manner as described above, perhaps this time with different parameters. In other words, the lists 361 can be regrouped to produce "super-shingles" and the super-shingles can be re-fingerprinted, re-permuted, and re-sampled to produce "super-sketches."

The parameters are chosen so that even one common super-shingle is a very good indication of a very high resemblance between two documents, and the probabilities of false negatives and false positives are kept minimal. For example, the parameters are chosen such that there is a high probability their resemblance is at least 50%.

Clustering

Figure 4:
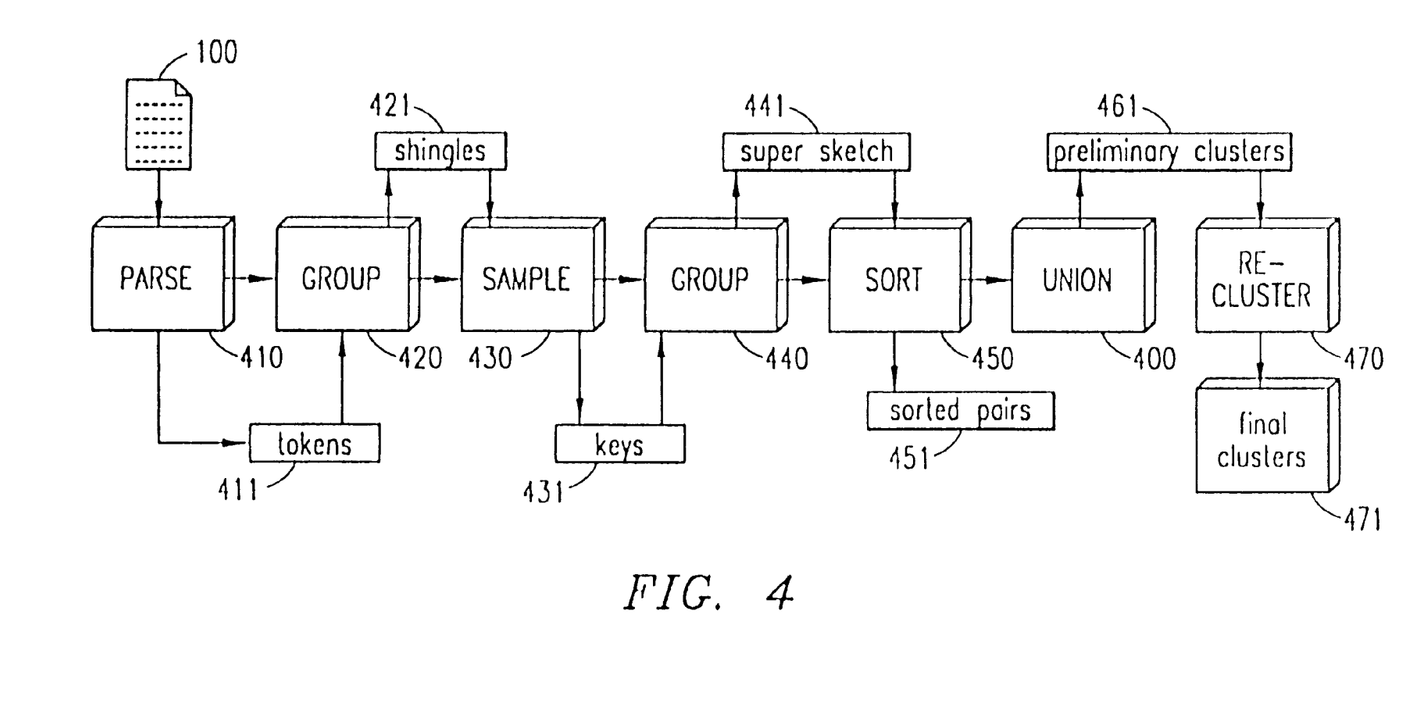
FIG. 4 is a flow diagram of a method for clustering documents.

Clustering can be performed as shown in FIG. 4. To do this, the sketch for each document 100 is expressed as an input list of pairs 410 (shingle value, document ID). In step 420, the pairs are sorted using a standard divide and concur method by first sorting groups of pairs related to individual documents, and than merging the sorted groups of pairs into an output list. This method is well suited where the input and output lists are too large to store in a DRAM memory.

A union operation is performed on the sorted pairs to identify preliminary clusters, i.e., at least two documents that have some resemblance, for example, documents that share some common shingles. The "unions" are identified in a single pass over the sorted list of pairs 410. This step expands into lists 430 of triples ($ID_1$, $ID_2$, count) where the IDs of two documents are linked, and the count reflects the number of common shingles among the two documents.

The lists 430 can be sorted in step 440 according to the ID of the first document to produce preliminary clusters 450. This step has the largest memory requirement because for efficient operation it is necessary to hold the entire union-find data structure in a fast memory. This can be further is refined by computing the resemblance estimate for any pair of documents whose sketches have sufficient elements in common.

It is normally expected that roughly 60% of a representative sample of Web documents do not share any super-shingles. These documents can quickly be weeded out to reduce storage requirements. In fact, the average cluster has only 3.4 documents, and 70% of the clusters have only two documents. Only a few clusters have more than ten thousand documents.

Clustering based on super-shingles can be performed in less time and with less storage than by simply using shingles and sketches. In this case the preliminary clusters are formed on the basis of few or even just one common super-shinale. These preliminary clusters can be further refined as above. However, processing the Web may still take several days. In addition, for short documents that do not produce many shingles, the error in estimating the resemblance can be larger. Second, super-shingles cannot detect containment, that is, does a document A roughly contains a document B.

The containment of B in A is defined as:

$$|S(A, k) \cap S(B, k)|/|S(B, k)|.$$

That is, the ratios between the number of shingles common to A and B, and the total number of shingles in B.

For example, a larger document contains a complete copy of a smaller document. In this case, the sketch of the larger document contains all the shingles of the smaller document, plus extra shingles representing content of the first document not in the smaller document. When the shingles are sorted for the larger document, the extra shingle will be interspersed among the common shingles. Therefore, the sequence of shingles and the super-shingles for the two documents will differ.

Filtering

In some cases, it is not necessary to determine the precise value of resemblance, only the fact that the resemblance is above a certain high threshold, for example 97%. This is called filtering, since typically we are trying to filter out near-identical documents. In this case, it is not necessary to keep the original sketches, and it is possible to use much less memory as described below.

Filtering works well even for short documents, where the embodiment described above might not produce enough relevant shingles. Additionally, filtering is mathematically "cleaner," and has sharper bounds on errors of both types, i.e., false positives (claiming that two documents resemble, when they do not) and false negatives (claiming that two documents do not resemble, when they do). Filtering directly identifies clusters of documents having a high level of resemblance using less storage, although more time may be required to produce the sketches.

Figure 5:
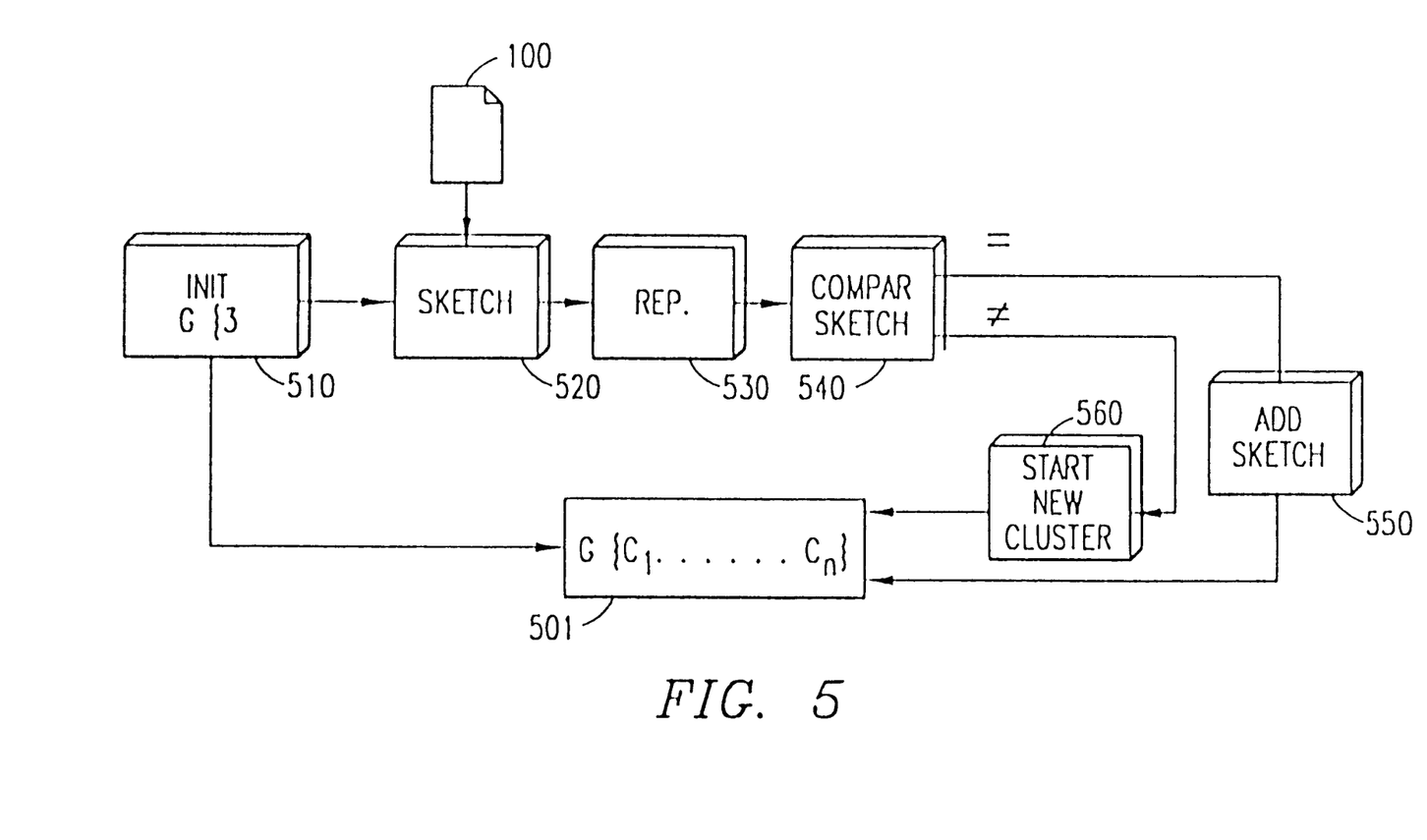
FIG. 5 is a flow diagram of a method for extracting document features using multiple independent pseudo-random permutations.

As shown in FIG. 5, each document 100 is parsed (510) to a sequence of canonical tokens 511, and the tokens 511 are grouped (520) into shingles 521. Each distinct shingle w 521, that is, subsequence of tokens, is represented by a unique number g(w) by fingerprinting as described above.

However, instead of sampling the s smallest elements from a single random permutation as described above, here, a plurality t of, for example, eighty-four (84) pseudo-random permutations of the universe of fingerprints (the set of all possible fingerprints, for instance the set $\{0, \ldots, 2^{64}-1\}$ for 8 bytes fingerprints) 531 are produced in step 530. In step 540, for each random permutation select only the smallest element s of the image of the set under that random permutation. The eighty-four samples so generated form the sketch 541. The probability that the image of two documents under a random permutation share the same smallest element s is equal to their resemblance.

The sketch so generated can be used as before to estimate the pair-wise resemblance simply by counting how many elements are common to the sketches of two documents A and B and dividing by the size of the sketch. For filtering purposes the sketch can be further reduced as follows.

In step 550, partition the t, e.g., 84 samples into k, e.g., 6, groups 551 of v, e.g., 14, elements each. In step 560, fingerprint each group 551 to generate six "features" 561. The parameters can be chosen to obtain the appropriate level of filtering, i.e., the levels of acceptance and rejection which can be graphed as shown and described below.

Fungibility

When two documents share more than r, for example, two features, the documents are called "fungible." Eventually, if two documents are fungible, then only one document will be retained for indexing by the search engine. Ideally, documents A and B are fungible if and only if their level of resemblance is greater than, for example, about 97%. Of course, this may be impossible to determine without storing all of the shingles. However, there are choices of parameters that provide reasonable estimates.

For instance taking the size parameters as k=15, v=30, r=4, one finds that the probability of a (false) positive at 90% resemblance is 0.3% and the probability of a (false) negative at 98% resemblance is 0.7%, ignoring fingerprint collisions, which should not be significant with 64 bits fingerprints.

Figure 6A:
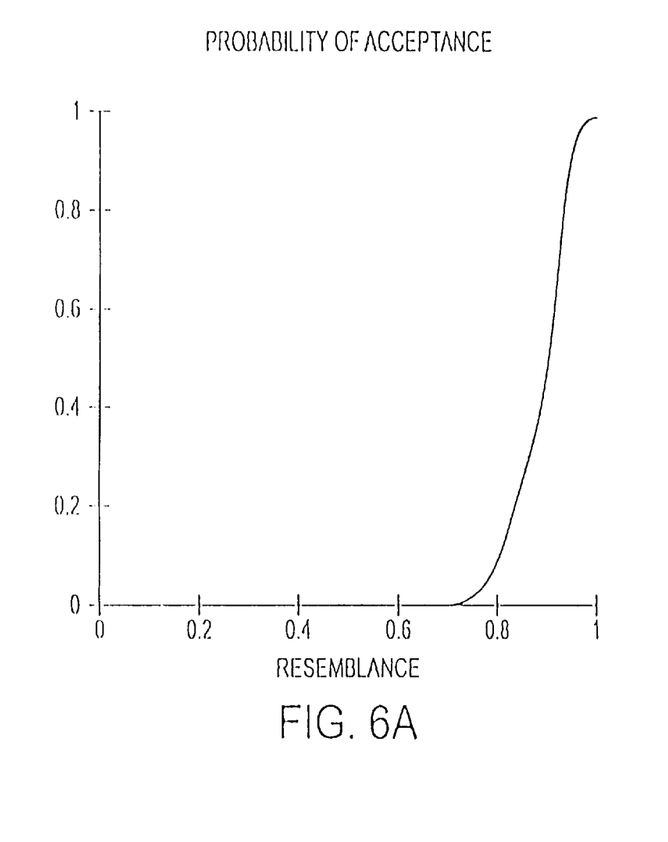
FIGS. 6a and 6b are graphs showing the probability of acceptance and rejection with the filtering of FIG. 5 for the case of six features of fourteen elements each and threshold equal to two.
Figure 6B:
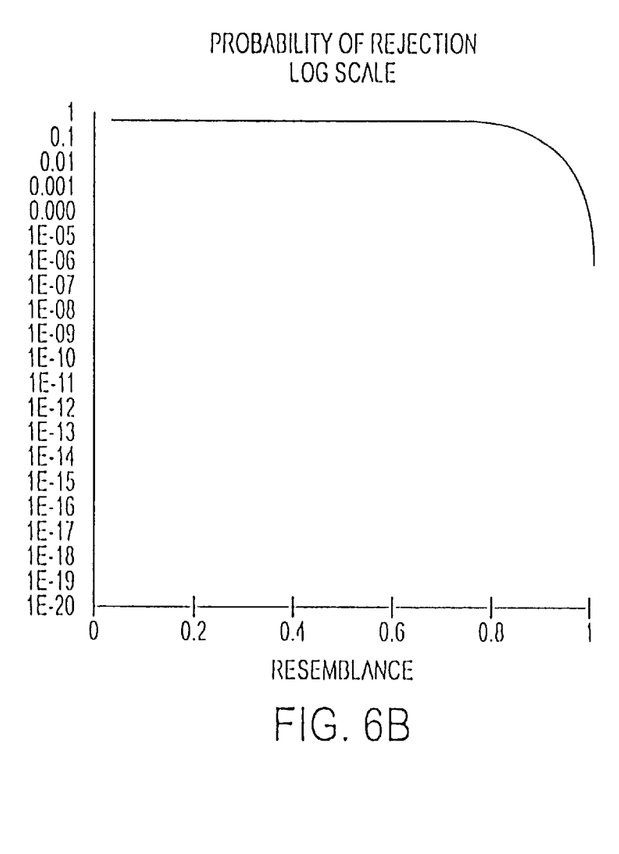

FIGS. 6a and 6b are graphs which can be plotted for a particular choice of parameters to show the probability of acceptance, and the probability of rejection, the later on a log scale. Here we took k=6, v=14 and r=2. This would require only 8×k=48 bytes storage, assuming 8 bytes fingerprints per document, computed by applying v×k=84 random permutations to the fingerprint of each shingle in each document.

Figure 7:
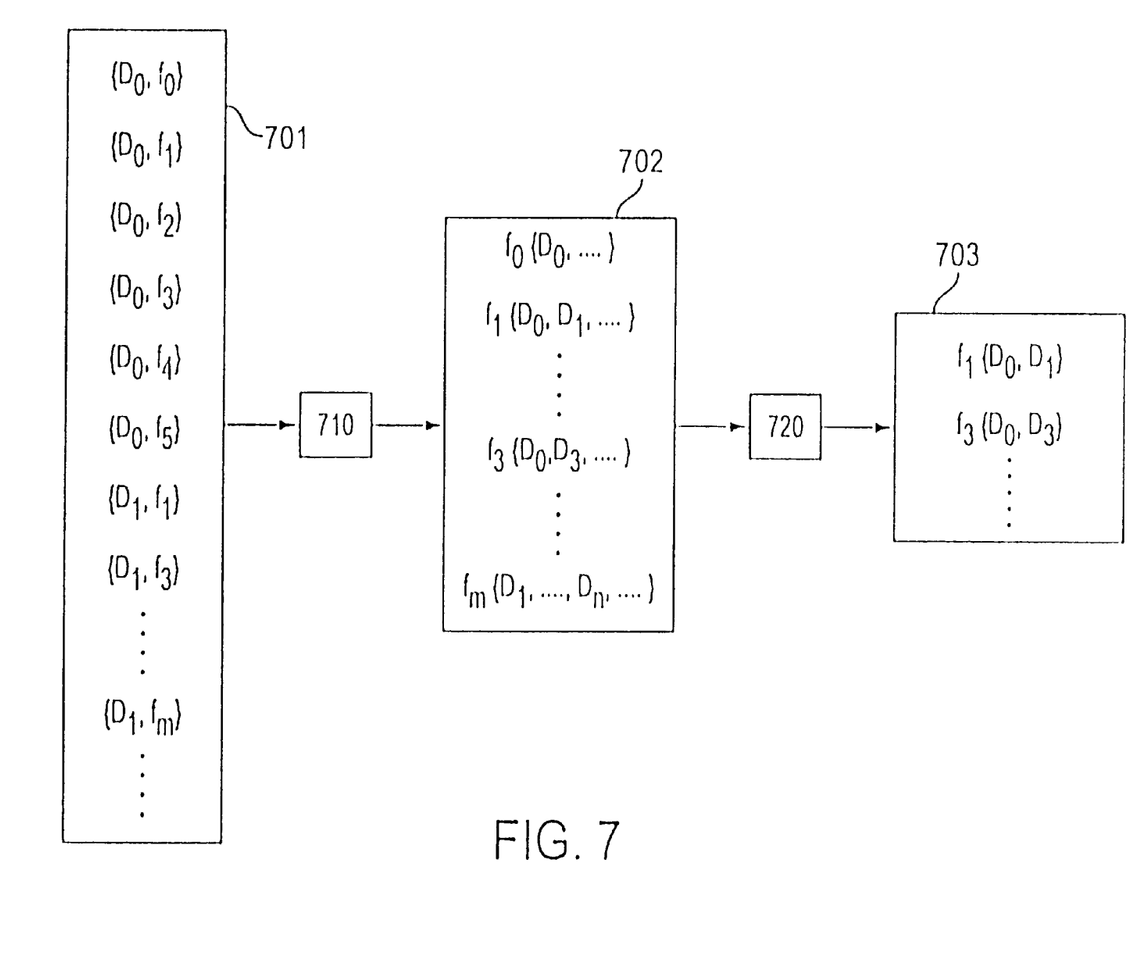
FIG. 7 is a flow diagram of a method for identifying pairs of documents sharing features.

As shown in FIG. 7, one method for determining fungibility proceeds as follows. Store pairs of entries of the form $\{D_i, f_j\}$ in a file 701, for example, for document $D_0$ including six features $f_0, f_1, \ldots, f_5$ store pairs $\{D_0, f_0\}, \{D_0, f_1\}, \ldots, \{D_o, f_5\}$. For document $D_1$, including features $f_6, f_7, \ldots, f_{11}$ store pairs $\{D_1, f_6\}, \{D_1, f_7\}, \ldots, \{D_1, f_{11}\}$, and so forth.

In step 710, sort the file 701 by feature to produce a list of features 702 and all the documents that include each particular feature. From the list 702 in step 720, it is possible to generate a third list 703 that identifies pairs of documents that share at least one feature. Should a pair of documents sharing the same feature appear a second time, then the pair of documents can immediately be declared fungible without having to count further occurrences.

Comparison of the methods

Creating sketches from a single permutation takes less time but more memory to store a relatively large sketch. Creating features from multiple permutations takes more time but less storage because the original sketch is not needed. It also works better for short documents where the first approach might not produce enough relevant samples, and is "cleaner" mathematically. Therefore, one can use sharp bounds on the probability of error of both types, e.g., false positives and negative. But the features based method can only determine fungibility (resemblance beyond a high level) and can not be used to determine lower levels of resemblance.

With the methods as described herein, one can quickly cluster a huge collection of documents. The coarse clustering can further be refined to obtain clustering at a more precise level of resemblance.

Processing about 84 million Web documents to be indexed by the AltaVista™ search engine identified about 18M documents which could be eliminated translating to a saving of approximately $6,000,000 in data processing equipment that would otherwise have been required to store the duplicates. Some additional optimization techniques that can be applied during clustering, are now described.

Common shingles

Very common shingles, for example, shingles that are likely to appear in more than a thousand documents, pose a severe performance during clustering based on full sketches, although filtering appears immune to this problem. The number of document ID pairs is quadratically proportional to the number documents sharing a single shingle.

An examination of common shingles for Web pages reveals that nearly all are probably automatically generated. Common shingles include HTML comment tags that identify the program that generated the HTML of the document, shared headers or footers, and text sequences including a sequence of numbers.

These common shingles either have no effect on the overall resemblance of the documents, or they create a "false" resemblance between what basically are two distinct documents. Therefore, processing the can be reduced when common shingles are ignored.

Identical documents

When exactly identical documents are eliminated, the computational workload can further be reduced By the present definition, identical documents share the same set of shingles, therefore, for clustering, only one set needs to be retained for the entire cluster. Similarly, copies of lexically equivalent and shingle-equivalent documents can be eliminated. Lexically equivalent documents are identical after they have been reduced to canonical form. The shingle-equivalent documents have the same set of shingles after the shingles have been selected.

Accordingly, each cluster of identical or equivalent documents can be represented by a single fingerprint. For identical documents, fingerprint the entire document. For equivalent documents, fingerprint either the canonical form or the set of shingles sorted. Then, if two documents with identical fingerprints are encountered, all but one can be eliminated from the clustering process After clustering completes, the eliminated documents can be added back in.

Greedy clustering with full sketches

As described above, sketches are stored as an ordered list. In this way, the sort-merge operation can be used to remove duplicates, and count the number of duplicates encountered during within the first s outputs. In many cases it will be likely that one is interested in more than two documents. However, for m documents, evaluating all resemblances takes $O(m^2s)$ amount of time. A greedy clustering can be implemented to perform the evaluation in $O(ms)$ time, a significant improvement.

Figure 8:
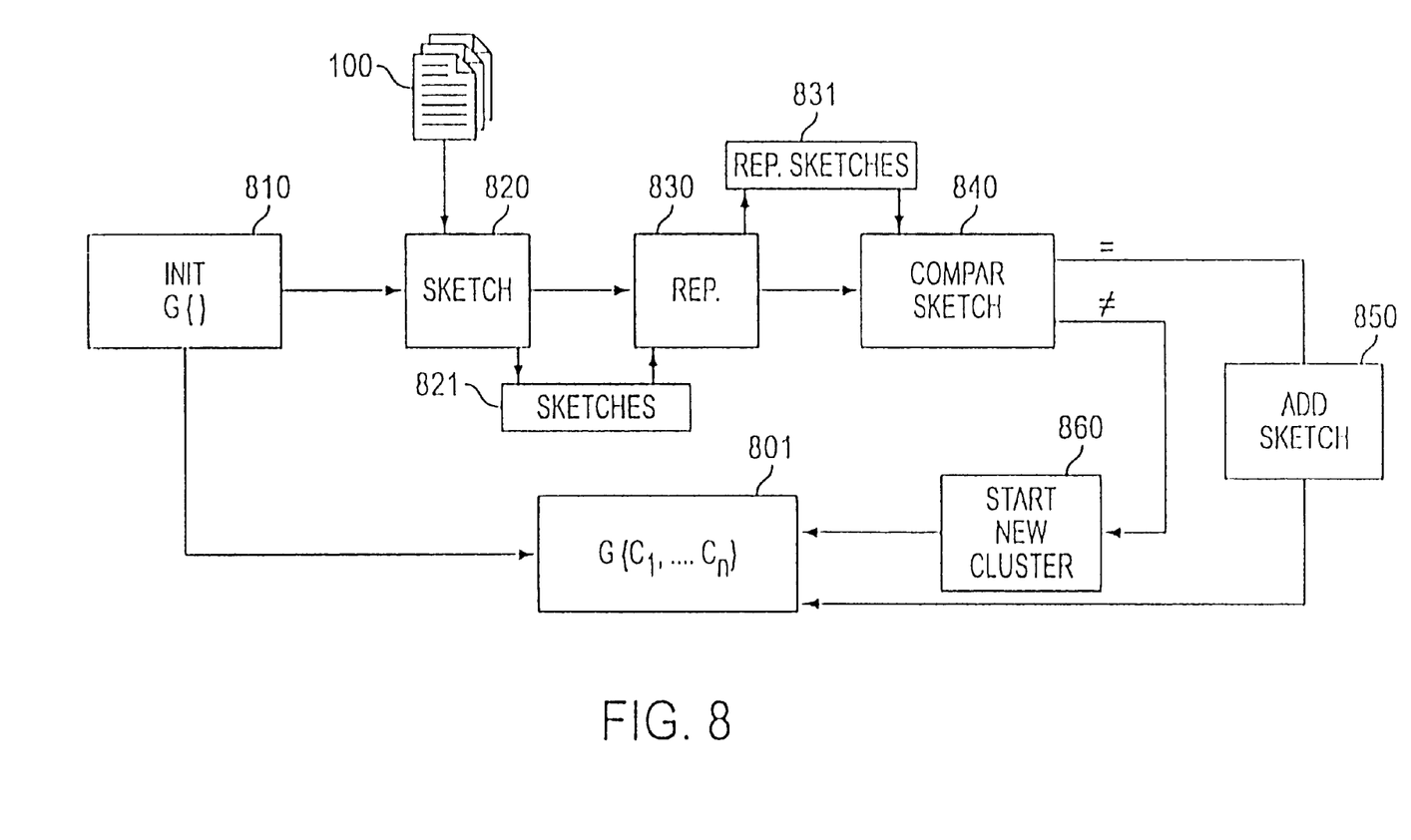
FIG. 8 is a flow diagram of a method for maintaining clusters of resembling documents.

As shown in FIG. 8, initialize an empty set of clusters G{} in step 810. A set of current clusters $G\{c_1, c_2, \ldots, c_n\}$ 801 is maintained as follows. In step 820, process the documents 100 in turn to produce sketches 821. For each cluster, $c_i$ keep a representative sketch 831, step 830. As a representative sketch of a cluster, take the s most frequently occurring fingerprints in the cluster, or simply just the sketch of the first document in the cluster. Compare each new sketch with the sketches of the current clusters in step 840. If a new sketch sufficiently resembles the sketch of a current cluster, then add the sketch (850), otherwise start a new cluster (860).

In practice, it is likely that a particular fingerprint belongs to only a small number of representative sketches. Therefore, for each fingerprint encountered, remember to which cluster the fingerprint belongs, and store the fingerprint in a hash table.

Variable Threshold Clustering

As described above, clustering is done with fixed parameters that have to be determined in advance when it is desired to include contained and containing documents. Alternatively, the documents can be reprocessed a second time with different permutations. During the second pass, an abbreviated sketch is kept for each document, for example, instead of keeping an eight byte fingerprint for each selected shingle in the sketch, we keep only one byte of the selected shingle fingerprint.

Then, for each pair of documents that is deemed fungible during the first filtering pass, the resemblance can be estimated more precisely during the second pass. The second pass is relatively inexpensive to perform, and the output clusters are relatively compact. Therefore, depending on the desired resemblance checking application, any number of different clustering policies can be implemented.

Applications

The custering methods as described here are useful in a number of applications, particular in conjunction with a search engine such as AltaVista™.

Anti-Spam

The present invention is ideal for dealing with multiple copies of identical, or nearly identical, documents that are submitted to a Web search engine for indexing. By determining the level of resemblance between documents, similar documents can be eliminated to greatly reduce the storage requirements.

Batch answers to queries:

For example, if a search engine is processing a query submitted by a user, and the query matches a document in a certain cluster, all documents in the cluster can be returned as such in response to the query. Therefore the user will know that all these documents are nearly identical and might choose to retrieve only one of them. Alternatively, if a user has located a desired document at a specific URL, then the resemblance technique can be used to find other resembling documents.

Lost and Found:

Because of the highly dynamic nature of the Web, pages frequently get renamed, moved, or deleted. For example, by the time a user requests a Web page at a particular URL, the page might have moved to a different URL, or the server might have changed. If a sketch is kept for the old URL by a search engine, then it becomes possible to find currently indexed documents that at least have some resemblance to the "lost" document to satisfy the user's query. This is done by finding pages that have high resemblance to the stored sketch.

Version Tracking:

Clustering can also be used in locating all occurrences of a document, even if slightly edited. For example numerous sites on the Web store reformatted copies of FTC rulings regarding consumer credit. All these copies would be clustered together by the algorithms described above. Should changes occur in any of the rulings, it becomes possible to notify sites having copy of the rulings.

Real-time resemblance:

If the full sketch and ordered list of shingle-ID pairs is kept for each document, then "on-the-fly" document resemblance can be performed. In this application, the input can be any document, either a remote document located by its URL, or a locally stored document. It does not matter whether the input document was part of the original clustering, or whether the document has changed since it was submitted for indexing.

The process proceeds as follows. Determine the sketch of the document either by looking it up, or computing it from the document itself. Look up each shingle of the input document in the ordered pair lists. For each document in the list count the number of shared shingles. Based on the number of shingles determine the resemblance and contained/containment value. Sort the resemblances, and present the result.

Although his method consumes space and time, it offers more flexibility than precomputed clustering. For example, any document, even documents which were not part of the original input set of documents to be clustered, can be compared to all the other documents. For the AltaVista™ search engine that stores about 100 million documents, a result can be presented in a couple of seconds.

Time-based page characterization:

In addition, to keeping up-to-date URL information, the evolution of documents over time can also be tracked. For example, pages can periodically be compared to determine how similar a new version is to a previous version. If this is done for a representative sample of Web pages, the following questions can be answered: how often do pages change, how much do pages change over a specific period, for example, a month or a year, how often do pages move within a server or between servers, how many pages are created as a function of time, how long do they live, and how many die.

Plagiarism and intellectual property

The resemblance technique can also be used by authors to detect illegal copies of their work. Given a particular source document, it becomes fairly easy to detect copies of the document in a cluster, even if the changes are minor or simply a rearrangement, or change of licensing terms. Illegal compilations can also be detected using the contained/containing metric.

The clustering of resembling documents as described herein provides a convenient and efficient way to deal with document sets of unprecedented size and growth. It allows a search engine to better present results to clients using less storage.

The solution presented here can also be applied to other domains. Given the general technique of extracting features from a data object, it becomes possible to measure the distance between any two data objects, or to cluster a large number of data objects into sets of similar data objects. The data objects can digitally encode speech e.g., the tokens are phonemes, music, images or videos.

It is understood that the above-described embodiments are simply illustrative of the principles of the invention. Various other modifications and chances may be made by those skilled in the art which will embody the principles of the invention and fall within the spirit and scope thereof.

We claim:

1. A method for determining the resemblance of a plurality of data objects, the method comprising the steps of:

parsing each data object into a canonical sequence of tokens;

grouping contiguous sequences in the canonical sequence of tokens of each data object into shingles;

assigning a unique identification element to each shingle;

subjecting the unique identification elements to a plurality of permutations to provide a corresponding plurality of images;

selecting a smallest unique identification element from each of the plurality of images to provide a sketch of each corresponding data object; and comparing data object sketches so as to determine common smallest unique identification elements between data object sketches and thereby determine data object resemblance.

2. The method of claim 1, further comprising the steps of:

tracking a level of resemblance of each data object; and clustering data objects having a predetermined level of resemblance into clusters.

3. The method of claim 2, wherein the data objects are Web pages indexed by a search engine, further comprising the step of:

in response to a search query, returning all resembling Web pages in a particular cluster if one Web page of the particular cluster satisfies the query.

4. The method of claim 1, further comprising the steps of:
representing each data object by a super-shingle; and
determining levels of resemblance based on the super-shingles.

5. The method of claim 1, further comprising the steps of:
representing each data object by a plurality of features; and
clustering data objects sharing predetermined number of features.

6. The method of claim 1, wherein frequently occurring shingles are eliminated.

7. The method of claim 1, wherein the parsing, permuting, and selecting steps are performed with first parameters.

8. The method of claim 7, wherein the parsing, grouping, and selecting steps are repeated with second parameters to perform variable threshold filtering of the data objects.

9. The method of claim 1, wherein the data objects are Web pages to be indexed by a search engine, and wherein frequently occurring shingles are eliminated before assigning the unique identifications.

10. The method of claim 9, wherein the frequently occurring shingles include HTML comment tags that identify a program that generated the HTML comment tags of the Web pages, shared headers or footers, and text sequences including a sequence of numbers.

11. The method of claim 9, wherein only different Web pages are indexed.

12. The method of claim 11, wherein the different Web pages include lexically different Web pages.

13. The method of claim 1, further comprising the step of:
determining the resemblance of the data objects in real time.

14. The method of claim 1, further comprising the step of:
tracking multiple versions of the data objects.

15. The method of claim 1, further comprising the step of:
identifying illegal copies of a particular data object.

16. The method of claim 1, wherein the data objects encode audio and video signals.

17. The method of claim 1, wherein the unique identifications are fingerprints.

18. A computer data signal embodied in a carrier wave readable by a computing system and encoding a computer program of instructions for executing a computer process performing the method recited in claim 1.

19. An apparatus for determining the resemblance of a plurality of data objects, the apparatus comprising:
means for parsing each data object into a canonical sequence of tokens;
means for grouping contiguous sequences in the canonical sequence of tokens of each data object into shingles;
means for assigning a unique identification element to each shingle;
means for subjecting the unique identification elements to a plurality of permutations to provide a corresponding plurality of images;
means for selecting a smallest unique identification element from each of the plurality of images to provide a sketch of each corresponding data object; and
means for comparing data object sketches so as to determine common smallest unique identification elements between data object sketches and thereby determine data object resemblance.

20. An article of manufacture for determining the resemblance of a plurality of data objects, the article of manufacture comprising:
at least one processor readable carrier; and
instructions carried on the at least one carrier;
wherein the instructions are configured to be readable from the at least one carrier by at least one processor and thereby cause the at least one processor to operate so as to:
parse each data object into a canonical sequence of tokens;
group contiguous sequences in the canonical sequence of tokens of each data object into shingles;
assign a unique identification element to each shingle;
subject the unique identification elements to a plurality of permutations to provide a corresponding plurality of images of the unique identification elements;
select a smallest unique identification element from each of the plurality of images to provide a sketch of each corresponding data object; and
compare data object sketches so as to determine common smallest unique identification elements between data object sketches and thereby determine data object resemblance.

* * * * *